United States Patent [19]

Miyakawa

[11] Patent Number: 4,920,411
[45] Date of Patent: Apr. 24, 1990

[54] METHOD FOR PROCESSING IMAGE SIGNALS SO AS TO COLOR CORRECT THEM

[75] Inventor: Tadashi Miyakawa, Kaisei, Japan

[73] Assignee: Fuji Photo Film Co., Ltd., Kanagawa, Japan

[21] Appl. No.: 229,729

[22] Filed: Aug. 3, 1988

[30] Foreign Application Priority Data

Apr. 11, 1984 [JP] Japan ................................. 59-71000
Apr. 12, 1984 [JP] Japan ................................. 59-73590
May 1, 1984 [JP] Japan ................................. 59-88059

[51] Int. Cl.$^5$ .......................... G03F 3/08; H04N 1/46
[52] U.S. Cl. ........................................ 358/80; 358/75
[58] Field of Search ................. 358/75, 78, 80, 75 IJ

[56] References Cited

U.S. PATENT DOCUMENTS

| 4,591,904 | 5/1986 | Urabe et al. | 358/75 |
| 4,734,763 | 3/1988 | Urabe et al. | 358/80 |
| 4,745,466 | 5/1988 | Yoshida et al. | 358/75 |
| 4,845,550 | 7/1989 | Urabe et al. | 358/80 |

*Primary Examiner*—James J. Groody
*Assistant Examiner*—Randall S. Svihla
*Attorney, Agent, or Firm*—Wenderoth, Lind & Ponack

[57] ABSTRACT

An image signal processing method for a picture output device converts three color separation signals of an original into digital signals, color corrects the digital signals and records a color image using the color corrected signals. According to one embodiment, the multiplied result of three color separation signals and corresponding predetermined coefficients are stored in a memory as a data table. The multiplied results are sequentially read out from the memory and added together. Color corrected signals are outputted in accordance with the added result for recording of the color images. Acording to another embodiment, the color distribution of the three color separation signals is discriminated to obtain a specific color distribution signal. The specific color distribution signal is then inputted as an address signal into a color conversion table via an address editing circuit. According to yet another embodiment, the number of output colors of the color image is set in advance. The number of quantization levels for digitizing the three color separation signals is then set in accordance with the set number of output colors.

6 Claims, 13 Drawing Sheets

FIG. 15

ADDRESS (HEXADECIMAL NOTATION)

| Address | Content | Size | |
|---|---|---|---|
| 000 | $a_{11} \times 0$ | | |
| 001 | $a_{11} \times 1$ | | |
| 002 | $a_{11} \times 2$ | 256 BYTES | |
| 003 | $a_{11} \times 3$ | | |
| ⋮ | ⋮ | | |
| 0FF | $a_{11} \times 255$ | | |
| 100 | $a_{12} \times 0$ | 256 BYTES | |
| 1FF | $a_{12} \times 255$ | | |
| 200 | $a_{13} \times 0$ | 256 BYTES | |
| 2FF | $a_{13} \times 255$ | | 9 × 256 BYTES |
| 300 | $a_{21} \times 0$ | 256 BYTES | |
| 3FF | $a_{21} \times 255$ | | |
| 400 | $a_{22} \times 0$ | 256 BYTES | |
| 4FF | $a_{22} \times 255$ | | |
| 500 | $a_{23} \times 0$ | 256 BYTES | |
| 5FF | $a_{23} \times 255$ | | |
| 600 | $a_{31} \times 0$ | 256 BYTES | |
| 6FF | $a_{31} \times 255$ | | |
| 700 | $a_{32} \times 0$ | 256 BYTES | |
| 7FF | $a_{32} \times 255$ | | |
| 800 | $a_{33} \times 0$ | 256 BYTES | |
| 8FF | $a_{33} \times 255$ | | |

FIG. 16

ADDRESS (HEXADECIMAL NOTATION)

| Address | Value |
|---------|-------|
| 0 0 0 | $a_{11}$ X 0 |
| 0 0 1 | $a_{11}$ X 0 |
| 0 0 2 | $a_{11}$ X 0 |
| 0 0 3 | $a_{11}$ X 0 |
| 0 1 F | $a_{11}$ X 0 |
| 0 2 0 | $a_{11}$ X 32 |
| 0 3 F | $a_{11}$ X 32 |
| 0 4 0 | $a_{11}$ X 64 |
| 0 E 0 | $a_{11}$ X 224 |
| 0 F F | $a_{11}$ X 224 |
| 1 0 0 | $a_{12}$ X 0 |
| 1 F F | $a_{12}$ X 224 |
| 2 0 0 | $a_{13}$ X 0 |
| 2 F F | $a_{13}$ X 224 |
| 3 0 0 | $a_{21}$ X 0 |
| 3 F F | $a_{21}$ X 224 |
| 4 0 0 | $a_{22}$ X 0 |
| 4 F F | $a_{22}$ X 224 |
| 5 0 0 | $a_{23}$ X 0 |
| 5 F F | $a_{23}$ X 224 |
| 6 0 0 | $a_{31}$ X 0 |
| 6 F F | $a_{31}$ X 224 |
| 7 0 0 | $a_{32}$ X 0 |
| 7 F F | $a_{32}$ X 224 |
| 8 0 0 | $a_{33}$ X 0 |
| 8 F F | $a_{33}$ X 224 |

FIG. 19

ADDRESS (HEXADECIMAL NOTATION)

| Address | Content | |
|---|---|---|
| 000 | R (0) | ⎫ |
| ⋮ | ⋮ | |
| 0FF | R (255) | |
| 100 | G (0) | |
| ⋮ | ⋮ | NORMAL COLOR DATA |
| 1FF | G (255) | |
| 200 | B (0) | |
| ⋮ | ⋮ | |
| 2FF | B (255) | |
| 300 | BLANK | ⎭ |
| ⋮ | ⋮ | |
| 400 | R COLOR-0 | ⎫ |
| 401 | R COLOR-1 | |
| 402 | R COLOR-2 | |
| ⋮ | ⋮ | |
| 500 | G COLOR-0 | SPECIFIC COLOR DATA FOR COLOR CONVERSION |
| 501 | G COLOR-1 | |
| ⋮ | ⋮ | |
| 600 | B COLOR-0 | |
| 601 | B COLOR-1 | |
| ⋮ | ⋮ | ⎭ |

← 12 BITS →

METHOD FOR PROCESSING IMAGE SIGNALS SO AS TO COLOR CORRECT THEM

This application is a continuation, of now abandoned application Ser. No. 722,215, filed Apr. 11, 1985, now abandoned.

BACKGROUND OF THE INVENTION

1. Field of the Invention

This invention relates to a picture processing method for a picture output device which processes picture signals for color correction and/or color conversion and then records the desired color pictures on a photosensitive material.

2. Description of the Prior Art

Conventionally, a picture output device which outputs a color picture from video signals in a display unit such as a cathode ray tube (CRT) typically has the structure as shown in FIG. 1 and FIGS. 2A and 2B. More particularly, the video signals VS from a display unit 1 are separated into the three primary colors of Red (R), Green(G) and Blue (B) and are read out. The read out colors are sampled by a sample-and-hold circuit 2, and then converted into digital values by an A/D converter 3 and then stored temporarily in a buffer memory 4. The digital video signals VSD read out from the buffer memory 4 are inputted into a picture processing circuit 5 which carries out color correction, gradation and so on. The processed picture signals of R', G' and B' are respectively fed into a driving circuit 6. Light emitted from the light emitting diodes (LED's) 8R, 8G and 8B, which are controlled by the driving circuit 6, irradiate a photosensitive material 11 which is arranged opposite the light emitting diodes 8R, 8G and 8B, thereby exposing the photosensitive material 11. The sample-and-hold circuit 2, the A/D converter 3, the write-in/read-out operations of the buffer memory 4 and the picture processing circuit 5 are controlled collectively by a control circuit 7 which comprises a microcomputer, for example.

FIGS. 2A and 2B show an example of the picture exposing section wherein a photosensitive material 11 is fixedly mounted with pins within a photosensitive material mounting member 12 having a mounting section 12A shaped as a semicylindrical recess. A rotary member 10 is supported on a rotational shaft 13 above the mounting section 12A in a manner so as to be rotatable in a predetermined direction (main scanning). Three light emitting diodes 8R, 8G and 8B of three primary colors are provided on the surface of the rotary member 10 at positions staggered by 120°. In this arrangement, when each of the diodes 8R, 8G and 8B respectively emit light in a predetermined order, the photosensitive material 11 mounted on the photosensitive material mounting member 12 is exposed to the emitted light so that pictures can be recorded thereon in correspondence with the screen images of the display unit 1. The rotary member 10 can be moved (for auxiliary scanning) in the axial direction X—X' of the rotational shaft 13. By rotation of the rotary member 10 and the movement thereof in the axial direction X—X', the displayed images can be recorded over the whole surface of the photosensitive material 11. FIGS. 3A and 3B show another example of the picture image output device wherein a photosensitive material 11 is loaded on a rotary drum 15, and rotated in the direction N by a rotational shaft 16 for main scanning. A recording head 14 having three light emitting diodes 8R, 8G and 8B for emitting light of the three primary colors RGB is provided opposite to the rotary drum 15. Auxiliary scanning is carried out by moving the recording head 14 in the direction M so as to record color pictures on the photosensitive material 11.

The color correction method of the picture processing circuit 5 employed in the picture output device as mentioned above carries out a digital color matrix operation. One example is disclosed in Japanese Laid-open patent application Ser. No. 178355/1983.

$$\begin{bmatrix} R' \\ G' \\ B' \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix} \quad (1)$$

The matrix of the above formula (1) is calculated by using a multiplier/accumulator. FIG. 4 schematically shows such a structure wherein the RGB color signals are color-separated and their timing controlled by the signals t1, t2 and t3 before they are inputted into latch circuits 20R, 20G and 20B. The latched data thereof are respectively inputted to multiplier/accumulators 24R, 24G and 24B via a multiplexer 21. The coefficient data of memories 23R, 23G and 23B are respectively inputted to the multiplier/accumulators 24R, 24G and 24B so that the result of the multiplication with the data outputted from the multiplexer 21 is sequentially accumulated. The memory 23R stores the coefficients a11 through a13 of the above formula (1), the memory 23G stores the coefficients a21 through a23, and the memory 23B stores the coefficients a31 through a33. The coefficients a11 through a33 are read out of the coefficients data memories by the timing signals t4 through t6 so as to feed corresponding coefficient data to the multiplier/accumulators 24R, 24G and 24B. For instance, when the red signal R' is to be obtained, the RGB signals are sequentially switched by the multiplexer 21 which is controlled by a control circuit 22 and inputted to the multiplier/accumulator 24R, and at the same time, the coefficients a11 through a13 are sequentially outputted from the memory 23R. In other words, when a R signal is inputted, the coefficient a11 is inputted; when a G signal is inputted, the coefficient a12 is inputted; and when a B signal is inputted, the coefficient a13 is inputted. The multiplier/accumulator 24R sequentially adds the results of multiplication of these data with the coefficients and outputs them as R'=a11.R+a12.G+a13.B. The same is applicable to the green signal G' and the blue signal B'. By using the circuit shown in FIG. 4, a modified formula for the signals R', G' and B' of the above formula (1) can be obtained.

The aforementioned prior art method is detrimental in that it requires as many as three expensive multiplier/accumulators, which leads to a high cost. Furthermore, the conventional method is problematic in that it requires a great deal of time to operate.

In such a conventional picture processing method, a specific input color, for instance black or purple, should sometimes be detected or the output color should be changed to a specific color such as white or yellow based upon the detection data. For detecting a color, relation of the levels of the data of the three primary colors RGB or the color distribution must be judged. For this purpose, an extremely complicated circuit incorporating comparators, etc is required. If a large number of colors must be detected, such circuits necessarily become large in number.

FIG. 5 shows an embodiment of a conventional circuit for color conversion wherein R and G color signals are inputted into a subtractor 30 for subtraction and a subtraction signal SB1 (=R−G) is inputted into a comparator 32 to be compared with a predetermined reference value m. Similarly, G and B color signals are inputted into a subtractor 31 for subtraction and a subtraction signal SB2 (=G−B) is inputted into a comparator 33 to be compared with a predetermined reference value n. The results of the comparison CM1 and CM2 from the comparators 32 and 33 are respectively inputted into a gate circuit 34. When the subtraction signal (R−G) becomes smaller than the preset value m and the subtraction signal (G−B) becomes larger than the preset value n, for instance, the gate circuit 34 outputs a detection signal DS to change the level of gradation changes so that an output color can be changed to a specific color. A similar color conversion may be carried out for other colors, provided that there is such a circuit for each conversion color.

As mentioned above, the color conversion circuit of the prior art becomes complicated in structure and expensive since such a color conversion method requires a large number of comparators and must incorporate a circuit combined with a comparator for each specific color.

Moreover, in the prior art picture output device, even when a video signal for the three primary colors RGB as shown in FIG. 6A is inputted into a processing device in order to clearly detect the colors for picture recording, the output signal becomes as shown in FIG. 6B due to the superposition of noise in the processing device or signal transmission paths. Therefore, the resultant video signal is inferior, and adjacent colors in a color picture may not be clearly determined on the recorded pictures. When color pictures are recorded, incoming video signals should be digitized for color correction. If the number of output colors is fixed, e.g. 16 or 32, it is not necessary to quantize an input video signal into an unnecessarily large number of portions for determining adjacent colors of an image. It is sufficient to set for color correction the quantization level to a number corresponding to the number of output colors.

SUMMARY OF THE INVENTION

This invention was conceived from the above point of views, and an object of this invention is to provide a picture processing method which can correct and convert colors with a high precision and at a high speed with a low cost output device.

Another object of this invention is to provide a picture processing method which can change predetermined input colors into predetermined output colors which may be arbitrarily selected, and which can digitize a video signal into a number of a quantization level corresponding to the number of output colors in order to clearly determine colors when the number of output colors is known.

According to one aspect of this invention, for achieving the objects described above, there is provided a picture processing method for a picture output device of the type which convert the three primary color video signals into digital values, corrected in color and recorded in color images, which is characterized in that the input/output ratio of the color distribution of the three primary color video signals is modified by a predetermined amount stored in advance, the color distribution of an input in the primary colors is measured, the corresponding data is read out of the stored data for color synthesis so as to enable outputting an arbitrary color for an input of a predetermined color.

According to this invention in another aspect thereof, there is provided a picture processing method for a picture output device of the type which convert the three primary color video signals into digital values, corrected in color and recorded in color images, which is characterized in that when a color correction signal is obtained by adding a coefficient to the color separation signal of the video signals of three primary colors, color correction is carried out by the steps of registering in advance the result of multiplication of the coefficient by the color separation signal in the form of a table, reading out data corresponding to the input color separation signal out of the registered data, and sequentially adding the above results.

According to this invention is still another aspect thereof, there is provided a picture processing method for the picture output device of the type which convert video signals of three primary colors into digital values, corrected in color and recorded in color picture image, which is characterized in that the quantization levels for digitizing the three primary color video signals is set at the steps corresponding to the number of colors of the output of a print picture so that a color picture composed of a predetermined number of colors in the output can be printed.

Furthermore, according to this invention in another aspect thereof, there is provided a picture processing method for a picture output device of the type which convert video signals of three primary colors into digital values, color corrected and recorded in color picture image, which is characterized in that the quantization levels for digitizing the three primary color video signals is set at the steps corresponding to the number of output colors of the recorded picture image, addition is sequentially carried out for color correction, the output color data for the color distribution of an input of said video signals as well as the color correction result are registered in the form of a look-up table in advance, an appropriate data is read out in correspondence with the video signal out of the registered data, and the output color distribution of the video signal is measured, a corresponding data is read out from the registered data for color synthesis.

The nature, principle and utility of the invention will become more apparent from the following detailed description when read in conjunction with the accompanying drawings.

BRIEF DESCRIPTION OF THE DRAWINGS

In the accompanying drawings:

FIGS. 15 and 16 are memory charts showing the data example of a look-up table 112 in FIGS. 14A and 14B, respectively;

FIG. 19 is a memory chart showing the data example of a look-up table 124 in FIGS. 14A and 14B.

DESCRIPTION OF THE PREFERRED EMBODIMENTS

Figure 1:
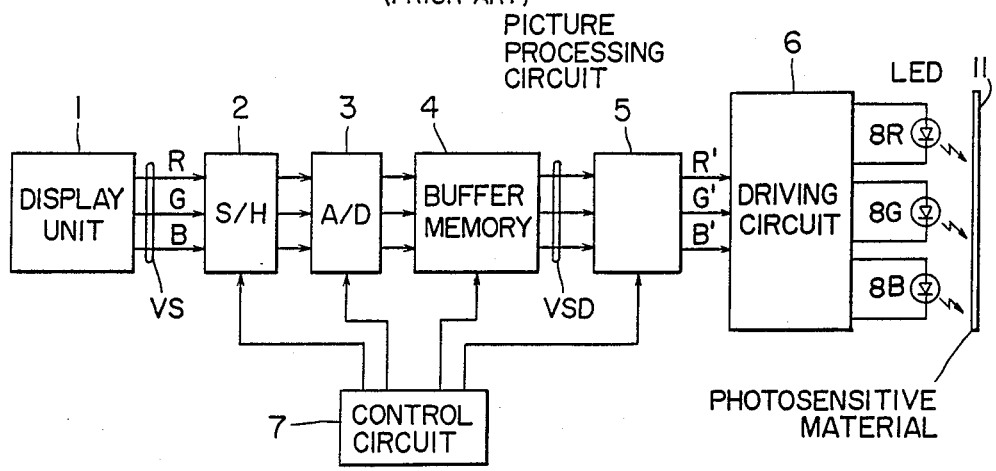
FIG. 1 is a block diagram showing an embodiment of the structure of a picture image output device.
Figure 2A:
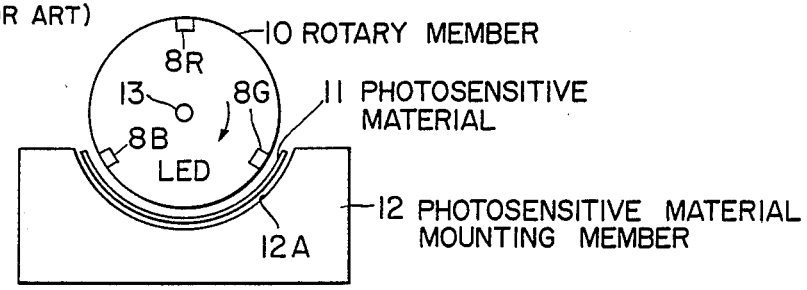
FIGS. 2A and 2B are a side view and a plane view of an exposing section thereof, respectively.
Figure 2B:
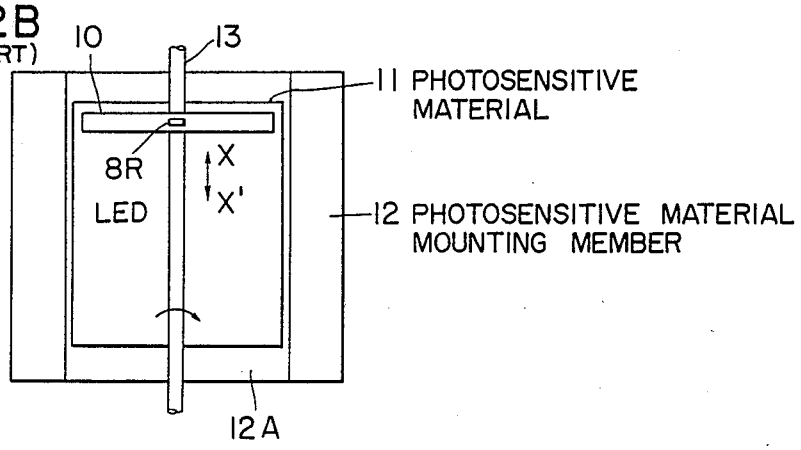
Figure 3A:
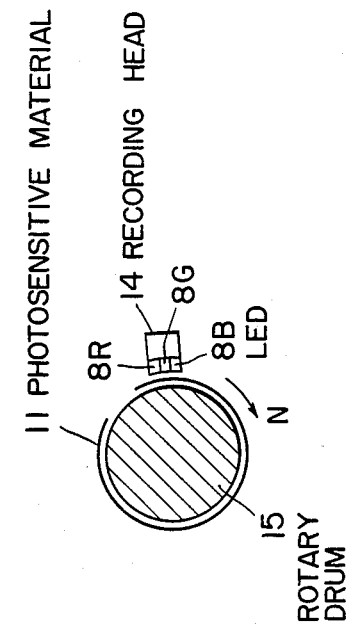
FIGS. 3A and 3B are a perspective view and a side view of another embodiment of the exposing section thereof, respectively.
Figure 3B:
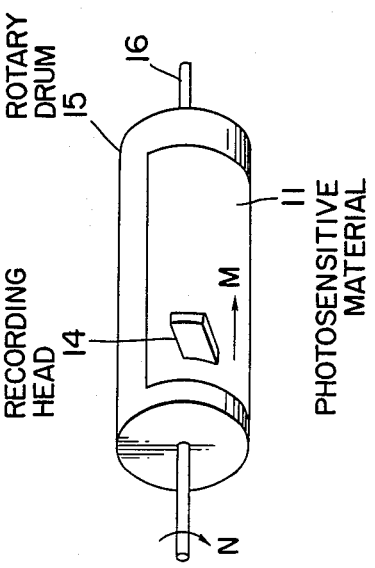
Figure 4:
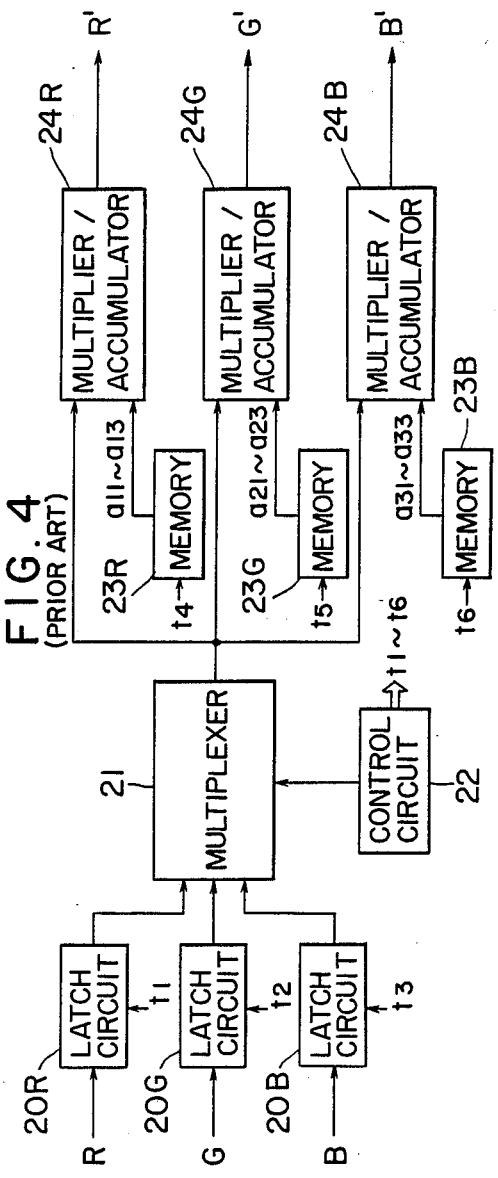
FIG. 4 is a block diagram showing a structure of an apparatus for carrying out a conventional color correction method.
Figure 5:
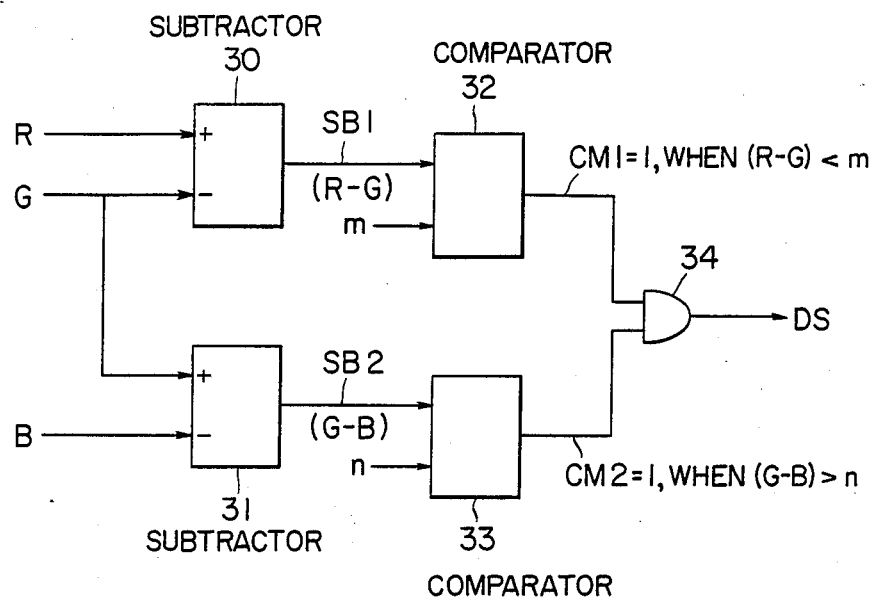
FIG. 5 is a block diagram of an embodiment of a circuit used for a conventional color conversion method.
Figure 6A:
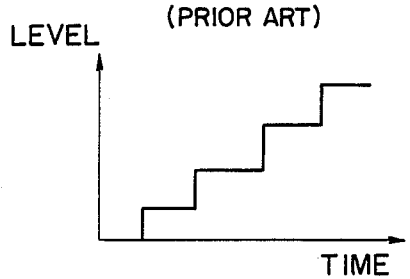
FIGS. 6A and 6B are views for explaining the color picture processing.
Figure 6B:
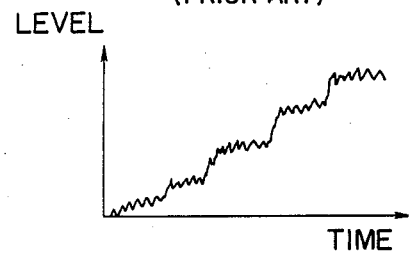
Figure 7:
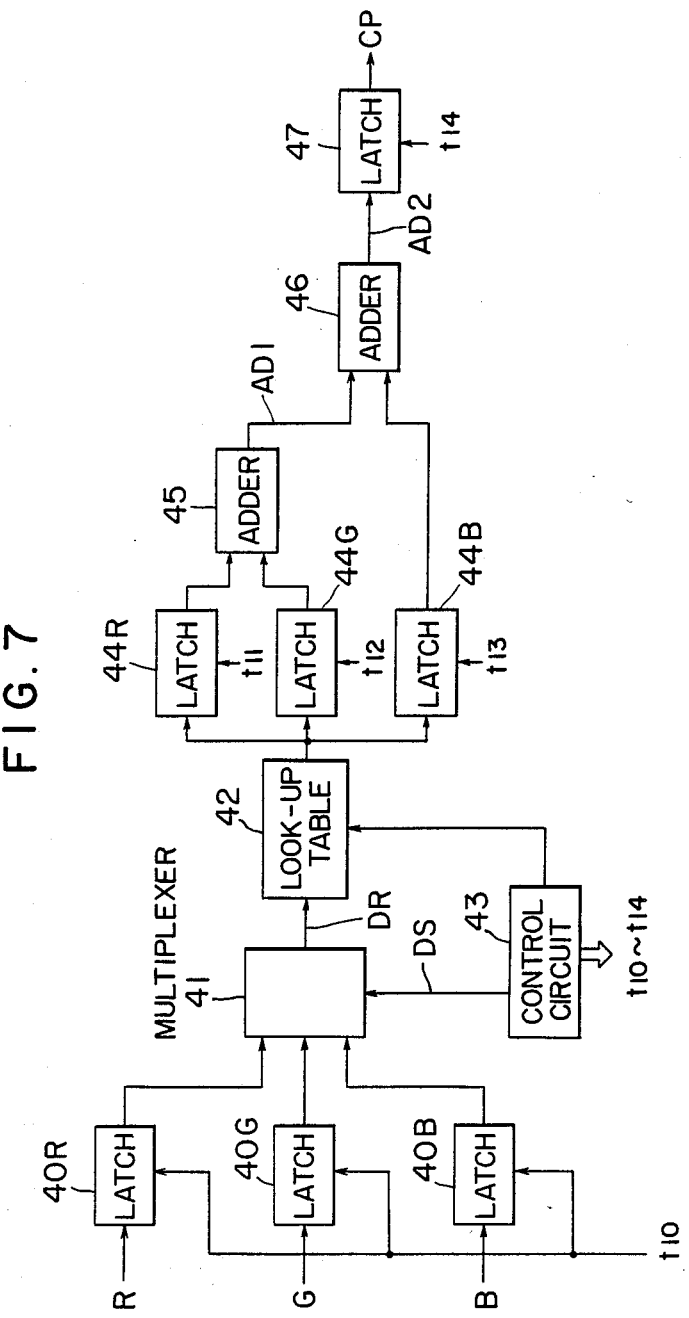
FIG. 7 is a block diagram showing an embodiment of an apparatus according to this invention.

FIG. 7 is a block diagram showing an embodiment of a color correction device in which this invention method is applied. The color video signals RGB of a color picture are inputed into latch circuits 40R, 40G and 40B. All of the latched data are sequentially selected by a multiplexer 41, controlled by a data sheet signal DS from a control circuit 43, to become an address signal DR which accesses the results registered in advance in a look-up table 42 comprising a ROM (Read Only Memory) or the like. The data read out of the look-up table 42 are sequentially latched by latch circuits 44R, 44G and 44B which are controlled by timing signals t11 through t13. An adder 45 adds latched data from the latch circuits 44R and 44G. An adder 46 adds the result of the addition AD1 from the adder 45 to the latched data from the latch circuit 44B, and the result of the addition AD2 is inputted into a latch circuit 47. The timing of the latch circuits 40R, 40G, 40B, 44R, 44G, 44B and 47 is respectively controlled by timing signals t10 through t14 from the control circuit 43. The results of the multiplication of the video signals RGB by the coefficients corresponding to respective levels of the video signals RGB are stored in advance in the look-up table 42. The level of the video signals RGB can be used as address signals DR and the multiplication result corresponding to the video signals RGB is outputted from the look-up table 42.

Figure 8:
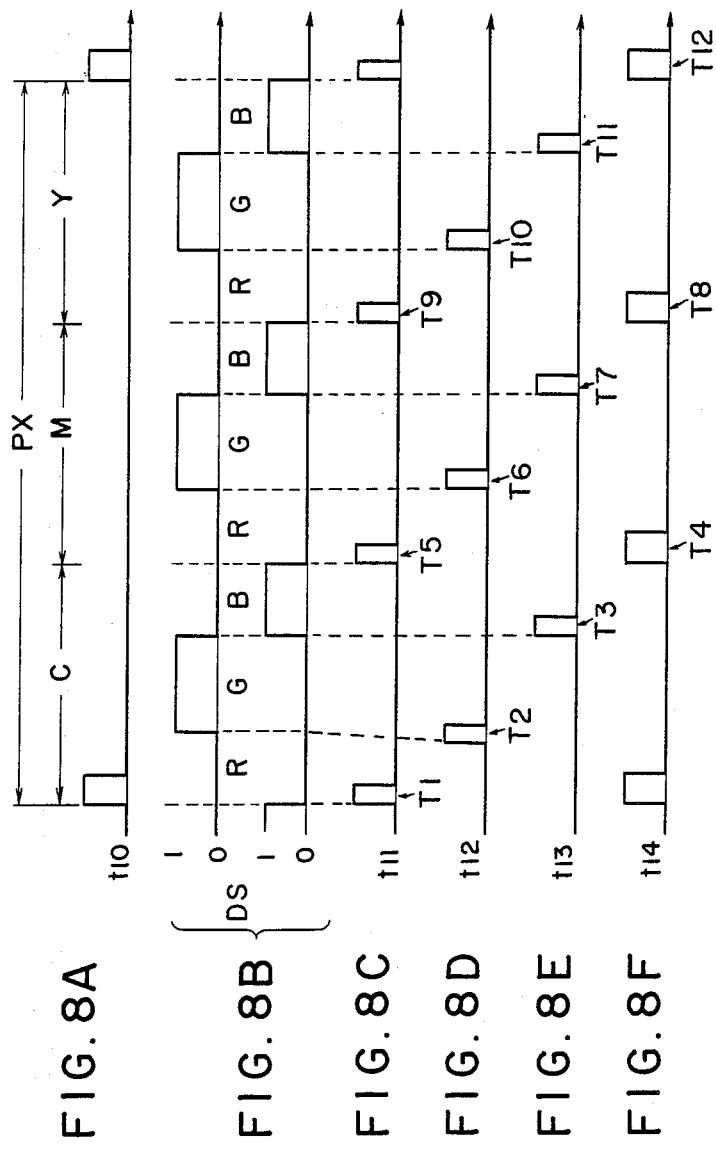
FIGS. 8A through 8F are timing charts showing examples of operations thereof.

The operation in the structure mentioned above is ow described referred to the timing charts shown in FIGS. 8A through 8F. The timing signal t10, having the timing interval shown in FIG. 8A, is inputted into the latch circuits 40R, 40G and 40B. The data os one pixel PX is taken in accordance with the timing signal t10. One pixel PX is divided into three parts, and assigned operation times of C, M an Y exposures. The control circuit 43 outputs a data sheet signal DS, comprising two bits as shown in FIG. 8B, to the multiplexer 41 and further divides each of the regions of CMY by the level of "0" or "1" of the two bits for reading out RGB signals. For instance, if a video signal R is selected by the data select signal DS in the region C, the result of multiplication of the coefficient a11, read out from the look-up table 42, by the video signal R is latched by the latch circuit 44R at the timing of a timing signal t11 (the timing T1 in FIG. 8C). Similarly, if the video signal G is selected, the result of the multiplication of the video signal G by a coefficient a12 is latched by the latch circuit 44G in accordance with a timing signal t12 (the timing T2 in FIG. 8D). If the video signal B is selected by the data select signal DS, the result of the multiplication of the video signal B is read out at a timing T3 shown in FIG. 8E by a timing signal t13 and latched by the latch circuit 44B. Accordingly, the adder 45 adds the data a11.R latched in the latch circuit 44R and the data a12.G latched in the latch circuit 44G. The result of the above addition AD1 (=a11.R+a12.G) is added to the data a13.B latched in the latch circuit 44B by the adder 46 and the result AD2 (=a11.R+a12.G+a13.B) thereof is latched by the latch circuit 47 at the timing T4 of the timing signal t14 (FIG. 8F). In this manner, a picture information CP corresponding to the color cyan C in one pixel PX is outputted.

The same operation described above is repeated for magenta M and yellow Y to obtain picture information CP which has been color-corrected by the above formula (1). In short, the data a21.R and a31.R are read out at the timings T5 and T9 of FIG. 8C, the data a22.G and a32.G are read out at the timings T6 and T10 of FIG. 8D, and the data a23.B and a33.B are read out at the timings T7 and T11 of FIG. 8E to output the summation of the adders 45 and 46. Such a color correction is carried out on a pixel by pixel basis.

Although the results of multiplying the video signals RGB by the coefficients a11 through a33 are referred to and stored in the look-up table 42 in the above embodiment, such a table may be prepared for each RGB.

Utilizing such an operation, color correction can be carried out at a high speed and at a low cost without the need of expensive multiplier/accumulators, simply by storing the multiplication results obtained in advance in a table.

Figure 9:
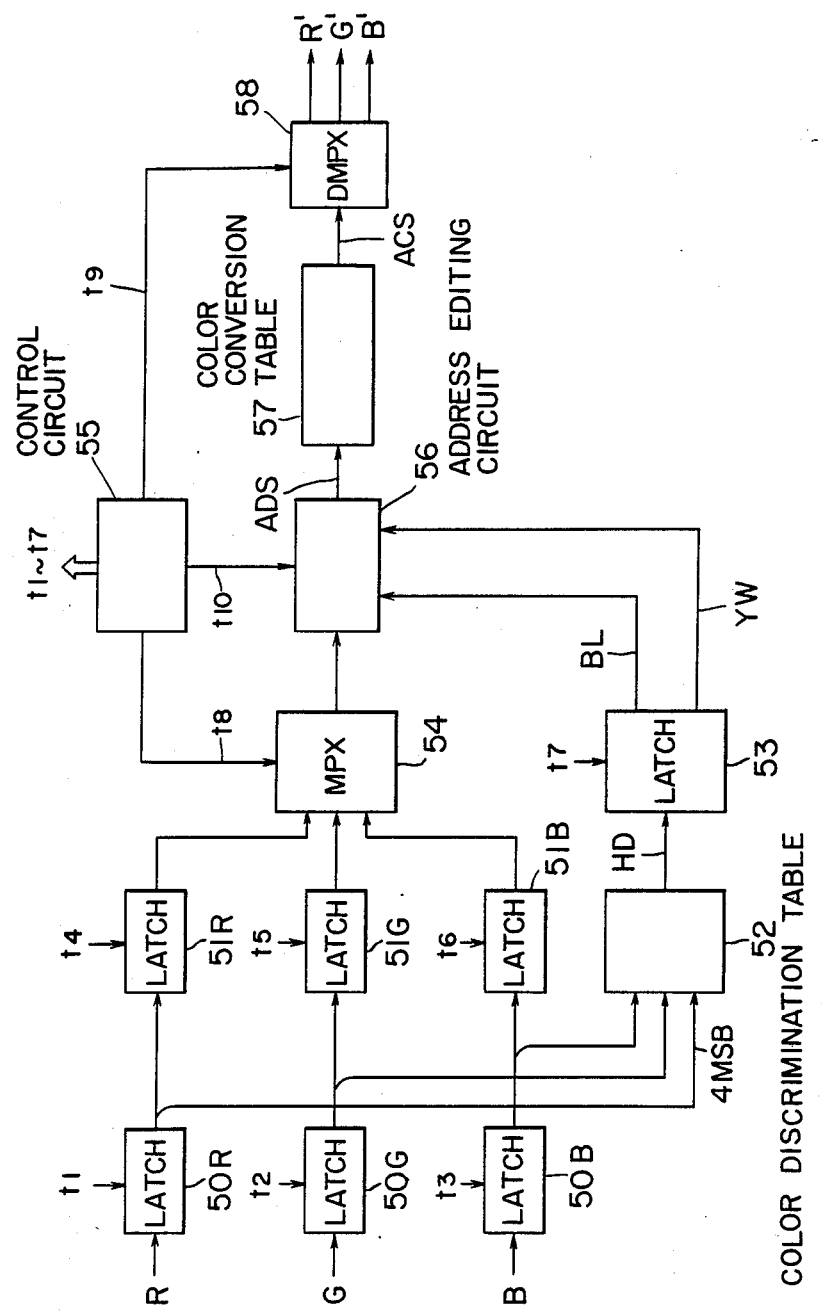
FIG. 9 is a block diagram showing an embodiment of a device which realizes the color output method according to this invention.
Figure 10:
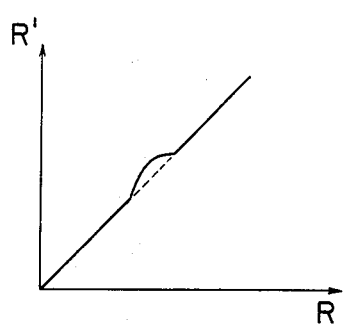
FIG. 10 is a graph showing an example of a color conversion table to be used for this invention.

When one desires to change an input of a predetermined color into a preselected color in the output pictures which may be arbitrarily selected, the structure shown in FIG. 9 may be used. In this example, color inputs of black (BL) and yellow (YW) of the original colors are converted into white and orange colors respectively when outputted in a picture image. The video signals of R, G and B are respectively latched by latch circuits 50R, 50G and 50B which are controlled timewise by timing signals t1 through t3 and all of the bits are time-controlled by the timing signals t4 through t6. They are further latched by the latch circuits 51R, 51G and 51B of the latter stage, respectively. The four most significant bits (MSB) are inputted into a color discrimination table 52 to detect whether or not specific colors (in this case, black and yellow) have been inputted from the color distribution of RGB. The hue signal HD determined from the color discrimination table 52 is latched by a latch circuit 53 by a timing signal t7 and inputted into an address editing circuit 56 as either a black signal BL or a yellow signal YW. The latch circuit 53 in FIG. 9 outputs the black signal BL or the white signal WH in accordance with the discriminated result in the color discrimination table 121. The RGB signals latched by the latch circuits 51R, 51G and 51B are sequentially inputted into an address editing circuit 56 by a timing signal t8 from the control circuit 55 via a multiplexer 54 to output the address necessary for the access of a color conversion table 57 which is stored in advance. The address signal ADS is inputted into a color conversion table (e.g. a ROM) 57 to output the color signal ACS which is stored in advance at the accessed address and inputs the same into a demultiplexer 58, which in turn outputs the color signals of R' (red), G' (green) and B' (blue) in order to form an output picture. The multiplexer 54, the address editing circuit 56 and the demultiplexer 58 are controlled by the control circuit 55 while the timing signals t1 through t7 are outputted from the control circuit 55. The color conversion table 57 stores data which can vary the gain characteristics of the input/output as shown in FIG. 10 or which synthesizes a preselected color with the combination of RGB. The color data which can convert an input of black into an output of white or which can convert an input of yellow into an output of orange are calculated and stored in the form of a table.

In this kind of structure, the digitized video signals RGB from a display unit are temporarily latched by the latch circuits 50R, 50G and 50B, and then inputted into the address editing circuit 56 via the latch circuits 50R, 50G and 50B and the multiplexer 54 to form the address signals ADS for the access of the color conversion table 57. The color distribution of the incoming video signals RGB or the color of the inputting signals are determined by the color discrimination table 52. In this example, the hue signal HD determined in the color discrimination table 52 is outputted for the predetermined colors of black and yellow and either one of the signals BL (black) or YW (yellow) is inputted into the address editing circuit 56 via the latch circuit 53. The address editing circuit 56 forms the address signal ADS with the color signals from the multiplexer 54 which can have access to normal color data or unmodified color data of the color conversion table 57; however, when it receives a black color signal BL from the latch circuit 53, the address editing circuit 56 forms the address signal ADS which can have access to the data necessary for converting the color signal ACS into the color of white. Similarly, when the yellow signal YW is received, the address editing circuit 56 forms the address signal ADS which can have access to the data for converting the color into orange. If the primary colors of RGB are distributed to form colors other than black or yellow, no change in needed, but when the video signals RGB are inputted into distribution in a form black and yellow, the color for output is converted into white or orange colors by means of the color conversion table 57.

Predetermined color signals are outputted for the inputs of predetermined colors by means of the color conversion table 57. The color signal ACS is outputted from the demultiplexer 58 which is controlled by the control circuit 55 in the form of the converted primary color signals R', G' and B' to become the information for forming output picture signals.

Although in the above embodiment an input of black color is converted into an output of white color, it is possible to convert a black input into a pale gray output. An input of other predetermined colors may be converted into arbitrarily preselected output colors. Although the input color is determined by the four most significant bits in the explanation noted above, it may be determined by all of the bits and the method may be changed in accordance with the precision required for the particular color determination.

The color conversion method described above enables one to output arbitrarily preselected colors for the input of predetermined colors by using a relatively simple structure but without the need of expensive comparators. The practical value of this invention method is therefore significant. Since the color conversion may be carried out with the data stored in the color conversion table, the table may be easily modified to allow a great degree of freedom in use.

Figure 11:
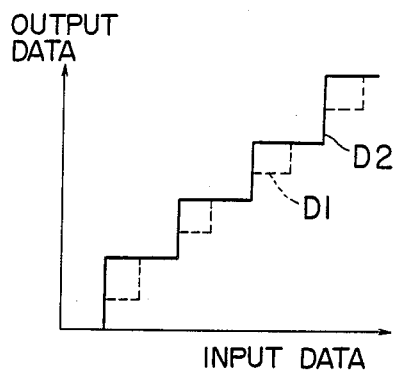
FIG. 11 and FIGS. 12A and 12B are graphs for explaining this invention method, respectively.
Figure 12A:
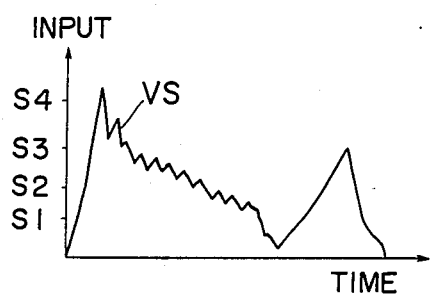
Figure 12B:
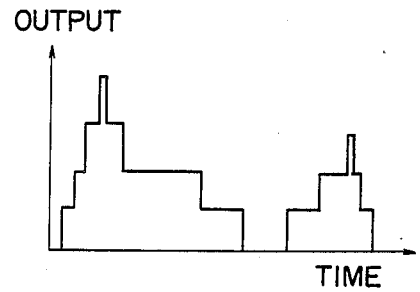

When the video signals RGB from the display unit are sampled for analog to digital conversion, if it is assumed that the original gradation change process for an input data comprises many small steps as shown by the broken lines D1 in FIG. 11, the number of colors in the output color picture can be reduced by restructuring the steps so as to have the quantization level s which are twice as large as the above steps as shown by the solid lines D2 in the figure. If such gradation conversion tables are prepared for each of three primary colors, the number of output colors in a color picture being recorded can be reduced to clarify the difference between adjacent colors in the image. By resetting the quantization levels as noted above, even if noise is superposed on the picture image data, the noise should be removed by the coarsely quantized table. Therefore, no color based on such noise is included in the color picture output which is obtained by synthesizing signals from the tables prepared for each color. FIGS. 12A and 12B are views showing how to output a picture image data for an input video signal by using the gradation conversion table according to this invention. When a video signal VS like the one shown in FIG. 12A is inputted, it is quantized at a relatively coarse level S1 through S4 in FIG. 12B, and the video signal VS is digitized.

Since the quantization levels of the gradation conversion table may be set at arbitrary levels for any magnitude of the input video signal, the number of output colors which are synthesized from the three primary colors can be limited to 8- or 16-colors. If the number of output colors is limited as above, then the colors can be set at the digital quantization values corresponding to the number of output colors. If each of the levels of RGB signals is set by two levels, color pictures can be outputted in 8-colors while they are set by three levels, the color pictures can be outputted in 27-colors instead.

Figure 13:
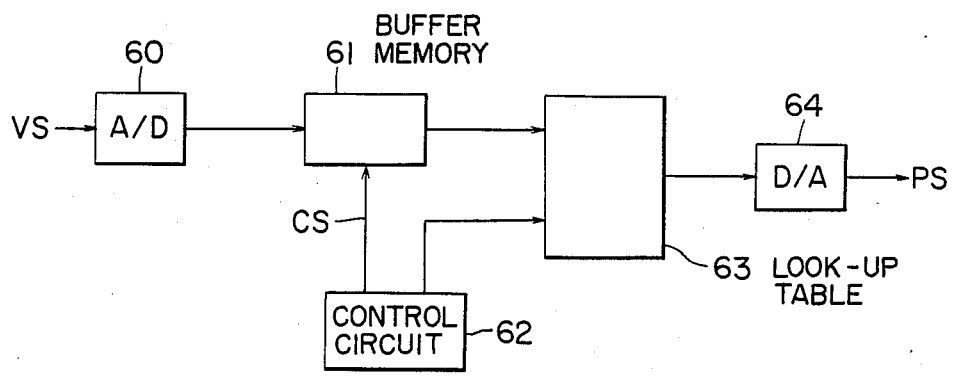
FIG. 13 is a block diagram showing an embodiment of the device which carries out quantization according to this invention method.

FIG. 13 shows an embodiment of the device for such a picture output. A video signal VS is converted into digital values by an A/D converter 60, and then stored in a buffer memory 61, and then read out from a look-up table 63 by a control signal CS from a control circuit 62 and quantized for each of the quantization levels preset in the look-up table 63. The look-up table 63 can quantize the incoming digital video signals from the buffer memory 61 for each predetermined level either by having written in the quantization levels for respective colors in advance in an ROM/RAM or by making the quantization level modifiable to any arbitrary level. The signals quantized and read out from the look-up table 63 are converted into analog values by a D/A converter 64 and fed to a recording section as a picture recording signal PS. The quantization levels registered in the look-up table 63 can be freely modified, or various quantization levels are preset and registered in advance so that a table corresponding to the number of colors of the output picture may be selected.

As described above, if an appropriate quantization level is preset in accordance with the number of output colors of color pictures, an input video signal does not have to be quantized minutely, and noise can be surely eliminated to thereby ensure the clear discrimination of colors in the output picture.

Figure 14A:
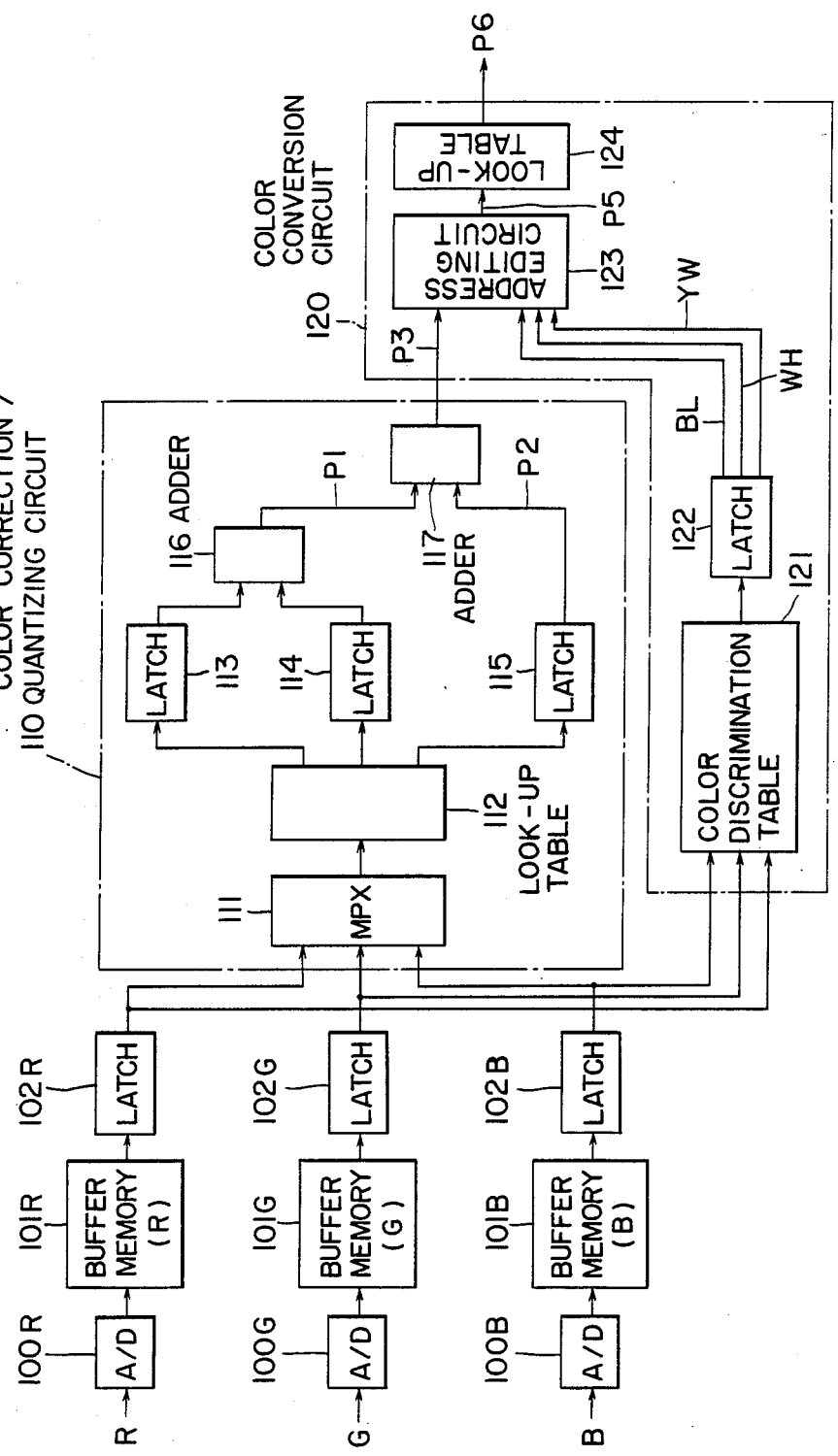
FIGS. 14A and 14B are block diagrams showing the whole structure of another embodiment of a device which realizes this invention method.
Figure 14B:
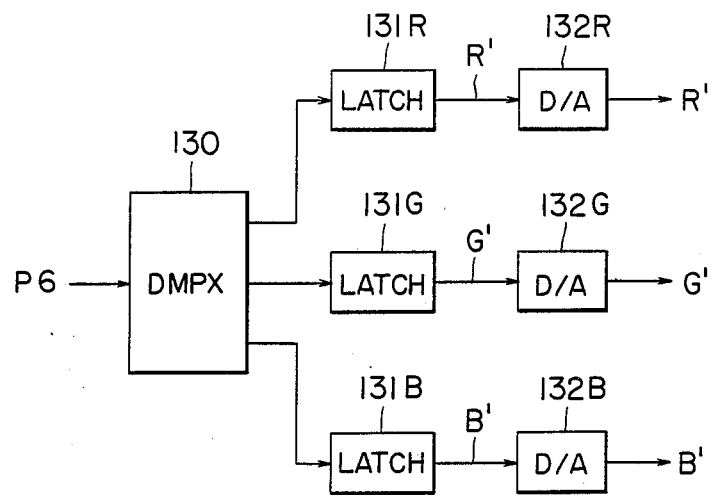
Figure 18:
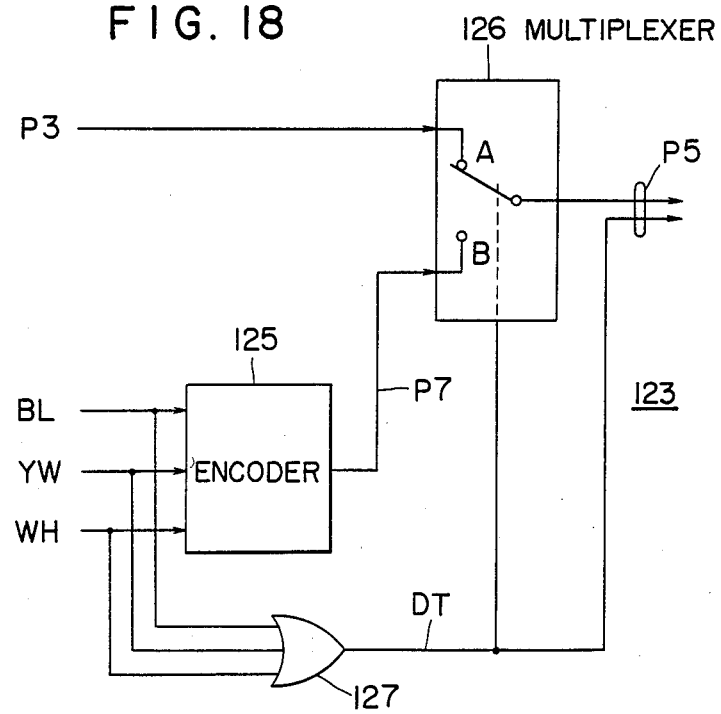
FIG. 18 is a block diagram showing an example of an address editing circuit.
Figure 17A:
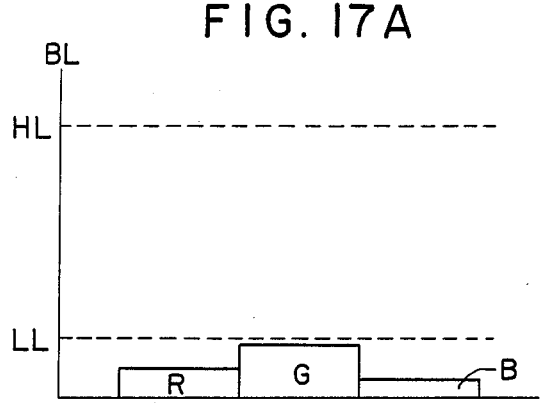
FIGS. 17A through 17C are diagrams for explaining the operation of a color discrimination table.
Figure 17B:
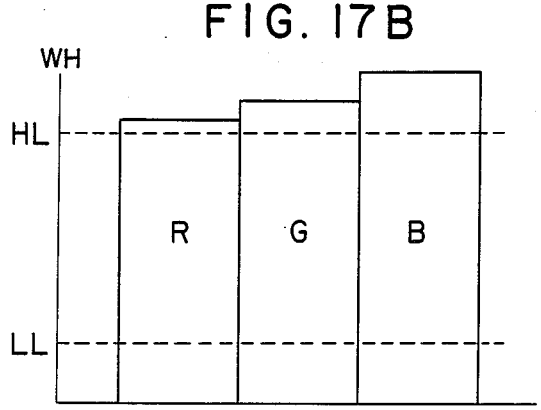
Figure 17C:
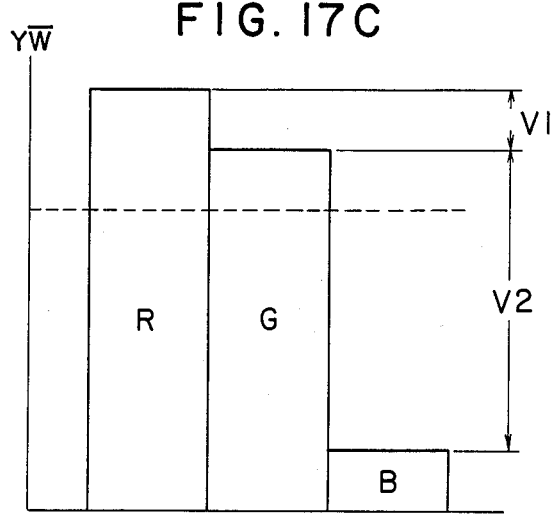

FIGS. 14A and 14B show an apparatus required for picture processing according to this invention. More particularly, the video signals RGB of a color picture are converted into digital values by A/D converters 100R, 100G and 100B respectively and temporarily stored in buffer memories 101R, 101G and 101B. The stored data is read out at a predetermined timing, and latched in latch circuits 102B, 102G and 102B and inputted into both a multiplexer 111 in a color correction/quantizing circuit 110 and to a color discrimination table 121 in a color conversion circuit 120. The color correction/quantizing circuit 110 quantizes the levels of signals from the latch circuits 102B, 102G and 102B. The color correction/quantizing circuit 110 has a look-up table 112 which stores color correction data, adds data and by an adder 116 via the latch circuits 113 and 114 and inputs the result P1 of this addition to an adder 117 for adding a signal P2 from a latch circuit 115. The latch 122 in FIG. 14A outputs one of the black signal BL, the yellow signal YW and the white signal WH in accordance with the discriminated result. FIG. 15 shows an example of the data contents in the look-up table 112 in the case of no data-quantizing, and FIG. 16 shows an example of the data contents in the case of data-quantizing. In these cases, the look-up table 112 consists of 9×256 bytes. FIG. 16 also shows the example of the case of quantizing to eight levels. The signal from the color discrimination table 121 is latched by a latch circuit 122, and inputted into an address editing circuit 123 in a color conversion circuit 120. In this case, the color discrimination table 121 discriminates between black (BL), white (WH) and yellow (YW) due to the digital color signals outputted from the latch circuits 102R, 102G and 102B. Black is detected when all of the colors RGB are lower than the low threshold level LL as shown in FIG. 17A and white is detected when all of the color RGB are higher than the high threshold level HL as shown in FIG. 17B. Yellow is detected when $V1 = |R-G| <$ constant value X (not shown) and $V2 = |Min(R,G) - B| >$ constant value Y (not shown) as shown in FIG. 17C. The color conversion circuit 120 outputs an address designation signal P5 of the look-up table 124 for color conversion. FIG. 18 shows an example structure of an address editing circuit 123 and FIG. 19 shows an example of the data contents in the look-up table 124. In FIG. 18, the color discrimination signals BL, YW and WH outputted from the latch circuit 122 are inputted to both an encoder 125 and to an OR gate 127, and a detection signal DT from the OR gate 127 is inputted into a multiplexer 126 as a switching signal and is also transferred to the look-up table 124 as an address signal. The signal P3 outputted from the color correction/quantizing circuit 110 is supplied to a contact A of a switch in the multiplexer and the output P7 of the encoder 125 is supplied to a contact B. The encoder 125 in FIG. 18 encodes the one input signal (1 bit) from among the BL, YW, WH signals into the plural bit signals (for example, 8 bits) which are the same number of bits as the signal P3. Namely, the encoder 125 arranges the number of bits of the input signal to be the same as that of the signal P3. The switch in the multiplexer 126 is switched by the detection signal DT. e.g. the switch is switched to the contact A when the signal DT is "L" and the look-up table 124 is accessed by the signal P3, and the switch is switched to the contact B when the signal DT is "H" and the table 124 is accessed by the signal P7. The signal P3 accesses the normal color data in the look-up table 124 and the signal P7 accesses the specific color data for color conversion in the table 124 as shown in FIG. 19. The color signal P6 outputted from the color conversion circuit 120 is inputted into a demultiplexer 130, and then separated into RGB color signals at a predetermined timing, and then latched by latch circuits 131R, 131G and 131B, and then converted into analog value respectively by D/A converters 132R, 132G and 132B. The address editing circuit 123 designates the address of the colors which should be converted irrespective of the color correction by the color correction/quantizing circuit 110 when the colors are the predetermined colors to be detected by the color discrimination table 121. The look-up table 124 function as a filter. The table 124 is adapted to convert colors in accordance with the address signal P5 from the address editing circuit 123, but when the color discrimination table 121 does not detect any of the predetermined colors, and color correction is not necessary, the table 124 executes the function of matching the system with the photographic material used for exposure.

In such a structure as described above, the video signals RGB are respectively converted to digital values by A/D converters 100R, 100G and 100B and inputted to the multiplexer 111 via buffer memories 101R, 101G and 101B and latch circuits 102R, 102G and 102B and inputted to the color discrimination table 121. The signals of RGB are outputted from the multiplexer 111 at a predetermined timing, and quantized into a predetermined number of portions by the look-up table 112, and color-corrected in color in accordance with the above mentioned formula (1) by the latch circuits 113 through 115 and adders 116 and 117. Thus quantized and color-corrected signals P3 from the adder 117 are inputted into the address editing circuit 123 to form an address signal P5 which reads out the data from the look-up table 124. In this case, the color discrimination table 121 monitors the inputted video signals RGB and, if any of the predetermined colors black, white or yellow is detected the BL, WH or YW signals are fed to the address editing circuit 123 via the latch circuit 122. With that signal, the address editing circuit 123 outputs the address necessary for changing the color into a different color (for instance, to change black into gray, white into gray or yellow into orange). The signals P6 from the look-up table 124 have been changed in color. The color signals P6 are inputted to the demultiplexer 130, separated into RGB at a predetermined timing, and outputted via latch circuits 131R, 131G and 131B and A/D converters 132R, 132G and 132B.

According to this invention, color pictures can be effectively processed with a simple structure. In other words, this invention method does not require expensive multiplier/accumulators for carrying out the color correction at a high speed. Though using a simple structure, this invention method can change an input of predetermined colors into an output of arbitrarily preselected colors, and does not need to quantize the video signals into unnecessarily small portions, and can surely eliminated noise, and clearly discriminate the colors in an output color picture.

It should be understood that many modifications and adaptations of the invention will become apparent to those skilled in the art and it is intended to encompass such obvious modifications and changes in the scope of the claims appended hereto.

I claim:

1. An image signal processing method for a picture output device, said processing method of the type which converts three color separation signals of an original into digital signals, color corrects the digital signals and records a color image in accordance with the color corrected signals, said method comprising the steps of:

storing in a memory as a data table multiplied results of said three color separation signals and corresponding predetermined color correction coefficients;

sequentially reading out respective multiplied results from said memory in accordance with the value of each of the digital signals converted from said three color separation signals;

adding said sequentially read out multiplied results; and outputting color corrected signals according to said added multiplied results for recording of said color image;

wherein a predetermined operating time for generating each of said color corrected signals for each pixel of said color image during said recording of said color image is divided into N operating times;

wherein a different one of the digital signals is inputted into the memory in a predetermined order during each of said N operating times;

wherein said adding step is conducted during each of the 2nd through Nth operating times using a temporary memory means, and wherein N is an integer greater than 1.

2. An image signal processing method for a picture output device, said processing method of the type which converts three color separation signals RGB of an original into digital signals, color corrects the digital signals and records a color image using the color corrected signals, said method comprising the steps of:

storing data as a color conversion table for outputting specific color signals in correspondence with respective specific color distributions of said three color separation signals RGB;

discriminating the color distribution of said three color separation signals RGB by inputting the digital signals converted from the three color separation signals RGB to a color discriminating table, wherein said color discriminating table outputs a specific color discriminating signal when the color separation signals have a respective specific color distribution;

inputting as an address signal said output specific color discriminating signal into said color conversion table via an address editing circuit; and outputting from said color conversion table the specific color signal corresponding to the output specific color discriminating signal.

3. An image signal processing method as claimed in claim 2 wherein said discriminating step is carried out by using upper significant bits of the digital signals.

4. An image signal processing method for a picture output device, said processing method of the type which converts three color separation signals RGB of an original into digital signals, color corrects the digital signals and records a color image using the color corrected signals, said method comprising the steps of:

setting a number of output colors of said color image;

setting a number of quantization levels for digitizing said three color separation signals RGB in accordance with said set number of output colors;

processing the digital signals converted from the three color separation signals RGB to have the set number of quantization levels;

color correcting the processed digital signals; and outputting analog signals in accordance with said color corrected signals to record a color image having said set number of output colors.

5. An image signal processing method as claimed in claim 4, wherein the processing step comprises the steps of:

preparing in advance, for each of the three color separation signals RGB, data tables containing values determined on the basis of a plurality of different numbers of quantization levels; and inputting the digital signals into the respective data tables corresponding to the set number of quantization levels, and outputting values in the respective data tables which correspond to the values of the inputted digital signals as the processed digital signals.

6. An image signal processing method for a picture output device, said processing method of the type which converts three color separation signals RGB of an original into digital signals, color corrects the digital signals and records a color image using the color corrected signals, said method comprising the steps of:

setting a number of quantization levels for digitizing said three color separation signals RGB in accordance with a set number of output colors of the color image;

storing in a first memory as a data table normal color data for said three color separation signals RGB, and specific color data for the three color separation signals RGB in accordance with a specific color distribution of said three color separation signals RGB;

storing in a second memory, for each of the three color separation signals, data tables containing multiplied results obtained by multiplying predetermined color correction coefficients by values determined on the basis of a plurality of different numbers of quantization levels;

dividing a predetermined operating time for generating each of the color corrected signals for each pixel of the color image during recording of the color image into N operating times, wherein N is an integer greater than 1;

inputting a different one of the digital signals into the respective data table in the second memory corresponding to the set number of quantization levels in a predetermined order during each of said N operating times, and outputting multiplied results in the respective data table which correspond to the values of the inputted digital signal;

temporarily storing the multiplied results output from said second memory during the N operating times;

adding said temporarily stored multiplied results during each of the 2nd through Nth operating times;

discriminating the color distribution of said three color separation signals RGB by inputting the digital signals into a color discriminating table which outputs a specific color discriminating signal when the three color separation signals RGB have a specific color distribution;

generating an address signal in accordance with said specific color discriminating signal outputted from said color discriminating table and said added multiplied results;

inputting said address signal into said first memory;

wherein said address signal causes said normal color data to be outputted from the first memory when said specific color discriminating signal is not outputted from the color discriminating table, and causes said specific color data to be outputted from the first memory when said specific color discriminating signal is outputted from said color discriminating table;

separating the data outputted from the first memory into three digital color signals RGB at a predetermined timing;

converting said separated signals into analog signals; and outputting said analog signals for recording of the color image.

* * * * *